(12) United States Patent
Bhunia et al.

(10) Patent No.: US 11,954,201 B2
(45) Date of Patent: Apr. 9, 2024

(54) FRAMEWORK FOR OBFUSCATION BASED WATERMARKING

(71) Applicant: University of Florida Research Foundation, Inc., Gainesville, FL (US)

(72) Inventors: Swarup Bhunia, Gainesville, FL (US); Tamzidul Hoque, Gainesville, FL (US); Abhishek Anil Nair, Gainesville, FL (US); Patanjali Sristi Lakshmiprasanna Sriramakumara, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 150 days.

(21) Appl. No.: 17/224,559

(22) Filed: Apr. 7, 2021

(65) Prior Publication Data
US 2021/0319101 A1    Oct. 14, 2021

Related U.S. Application Data

(60) Provisional application No. 63/007,916, filed on Apr. 9, 2020.

(51) Int. Cl.
*G06F 21/56*    (2013.01)

(52) U.S. Cl.
CPC ........ *G06F 21/56* (2013.01); *G06F 2221/034* (2013.01)

(58) Field of Classification Search
CPC ........................... G06F 21/56; G06F 2221/034
See application file for complete search history.

(56) References Cited

U.S. PATENT DOCUMENTS

| 6,625,780 | B1 * | 9/2003 | Charbon | G06F 30/30 716/111 |
| 8,447,985 | B2 * | 5/2013 | Ziener | G06F 21/81 713/176 |
| 11,175,338 | B2 * | 11/2021 | Liu | G01R 31/318563 |

(Continued)

OTHER PUBLICATIONS

Zalivaka et al., "Reliable and Modeling Attack Resistant Authentication of Arbiter PUF in FPGA Implementation With Trinary Quadruple Response"; IEEE Transactions on Information Forensics and Security, vol. 14, No. 4; Apr. 2019; p. 1109-1123 (Year: 2019).*

(Continued)

*Primary Examiner* — Wasika Nipa
*Assistant Examiner* — Zhe Liu
(74) *Attorney, Agent, or Firm* — Thomas | Horstemeyer, LLP

(57) ABSTRACT

The present disclosure describes systems, apparatuses, and methods for obfuscation-based intellectual property (IP) watermark labeling. One such method comprises identifying, by one or more computing processors, a specific net within an integrated circuit design that is likely to be used in a malicious attack; and adding additional nets to the integrated circuit design that add additional logic states to a finite state machine present in the integrated circuit design. The additional logic states comprise watermarking states for performing authentication of the integrated circuit design, in which a watermark digest can be captured upon application of secret key inputs to the additional nets. Other methods, systems, and apparatuses are also presented.

17 Claims, 7 Drawing Sheets

(56) References Cited

U.S. PATENT DOCUMENTS

| | | | |
|---|---|---|---|
| 2007/0014429 A1* | 1/2007 | He | H04L 9/3236 |
| | | | 382/100 |
| 2007/0220263 A1* | 9/2007 | Ziener | G06F 21/73 |
| | | | 713/176 |
| 2011/0029292 A1* | 2/2011 | Schellekens | G06F 30/33 |
| | | | 703/2 |
| 2011/0113392 A1* | 5/2011 | Chakraborty | G09C 1/00 |
| | | | 716/102 |
| 2018/0011130 A1* | 1/2018 | Aguayo Gonzalez | |
| | | | G06F 11/3062 |
| 2018/0013779 A1* | 1/2018 | Aguayo Gonzalez | |
| | | | H04L 63/0876 |
| 2019/0213331 A1* | 7/2019 | Sethumadhavan | G06F 21/87 |
| 2019/0372751 A1* | 12/2019 | Yanamadala | H01L 23/576 |
| 2019/0377024 A1* | 12/2019 | Zortman | H01L 23/544 |
| 2021/0314175 A1* | 10/2021 | Lu | H01L 21/823807 |

OTHER PUBLICATIONS

Edward et al., "Physical unclonable functions for device authentication and secret key generation," Proceedings of the 44th annual design automation conference, Jun. 2007, p. 9-14 (Year: 2007).*

* cited by examiner

FRAMEWORK FOR OBFUSCATION BASED WATERMARKING

CROSS-REFERENCE TO RELATED APPLICATION

This application claims priority to U.S. provisional application entitled, "FOWL: A Framework for Obfuscation Based Watermarking," having Ser. No. 63/007,916, filed Apr. 9, 2020, which is entirely incorporated herein by reference.

BACKGROUND

Today's semiconductor supply chain has become distributed due to economic and practical benefits. This distributed supply chain involves multiple entities across the globe who convert the intellectual property (IP) into a physical entity through fabrication known as an Integrated Circuit (IC).

Both the IP and IC are vulnerable to wide range of attacks ranging from theft, alteration, reverse-engineering, over-manufacturing, etc. For example, the ICs are also vulnerable to several attacks while deployed on the field. The IC can also be used to reverse engineer to reveal details about the underlying IP to facilitate IP-theft, identification, or malicious modification of critical components within the IP/IC. Additionally, the IP or IC could comprise smaller IPs/ICs which may or may not have been purchased from trusted entities. A third-party seller could simply provide a fake or recycled version of the IC as the genuine one, which could malfunction unexpectedly due to aging, defect, or hidden malicious alterations. Hence, there is great need for an identification mechanism (referred to as authentication) of IP and IC within the untrusted supply chain and in the field from both a vendor's and a consumer's perspective.

Correspondingly, watermarking is a hardware protection technique used for implanting the owner's signature in the IP and can hence be used for IP provenance and traceability analysis. It can also be used for effective authentication of IP blocks used in system on chip (SoC) design process. Watermarking enables the consumer to attest the trustworthiness of the IPs purchased through several third-party vendors at every stage in the design flow. Thus, post-fabrication authentication and verification of IPs used in complex SoCs by verifying their watermarks is an attractive solution for thwarting the aforementioned challenges. Unfortunately, existing watermarking techniques cannot prevent tampering and cloning of a watermark and they are often easy to locate.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods for powerful obfuscation-based intellectual property (IP) watermark labeling. In general, in order to effectively use a watermark in IP provenance and traceability analysis as well as integrity verification, the watermark should have the following major properties or guarantees:

1. Immutability: The watermark must remain unchanged through design transformation process, i.e., register transfer level (RTL) synthesis, logic synthesis, and physical design should not alter the watermark or optimize it.
2. Undetectability: It should be practically infeasible for an attacker (e.g., one in untrusted foundry) to locate and/or remove it;
3. Uniqueness: It should be unclonable, i.e., an adversary cannot embed or label the same watermark into another IP;
4. Verifiability: It should be easily verifiable by a legitimate user;
5. Coverage: It should provide high level of structural coverage, so that even minute structural changes in an IP can be captured by the watermark; and
6. Cost: It should come at low hardware and design cost.

Unfortunately, existing watermarking techniques used in current practice, fail to address these aforementioned needs. In particular, existing watermarking techniques cannot prevent tampering and cloning of a watermark and they are often easy to locate. Additionally, existing watermarking techniques do not provide mathematical guarantee against tampering; cloning; and design transformation invariance. Finally, existing watermarks, to the best of the inventors' knowledge, fail to provide high structural coverage of the design against malicious alterations.

In accordance with various embodiments of the present disclosure, a novel and powerful obfuscation-based IP watermarking scheme, referred to as Framework for Obfuscated Watermark Labeling (FOWL), is provided that is scalable to designs of any size; applies to both digital and mixed-signal IP blocks; maintains all the properties of embedded watermark through design transformation; and provides provable guarantee against cloning attacks and resistance against removal/tampering. An exemplary method/system leverages the advances in sequential obfuscation method to embed or label a watermark in a state space of a sequential design in a way that provides high structural coverage, while at the same time, being provably robust against cloning, tampering & removal, and incurring low hardware (area, power, delay) overhead.

Figure 1:
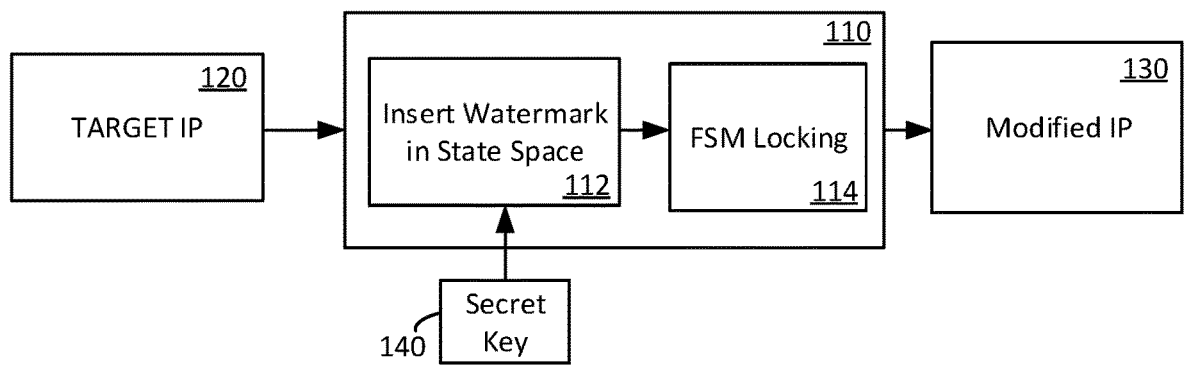
FIG. 1 depicts an exemplary system for powerful obfuscation-based intellectual property (IP) watermark labeling in accordance with various embodiments of the present disclosure.

FIG. 1 depicts an exemplary system 110 for powerful obfuscation-based intellectual property (IP) watermark labeling, in which a target IP 120 is input into the system 110 and the system 110 outputs a modified IP 130 that contains an IP watermark that is embedded in a state space of the target IP 120. The system 110 contains component(s) or logic 112 that is programmed to insert a watermark in the state space of the target IP based on a secret key 140 and component(s) or logic 114 that is programmed to lock or unlock a finite state machine (FSM) of the target IP that prohibits or allows functionality of the target IP 120 to be performed, respectively. Accordingly, upon acceptance of the secret key 140, functionality of the modified IP 130 is unlocked and available to be performed by the modified IP. Otherwise, upon input of an incorrect key, the functionality of the modified IP 130 is locked and unavailable to be performed by the modified IP.

Figure 2:
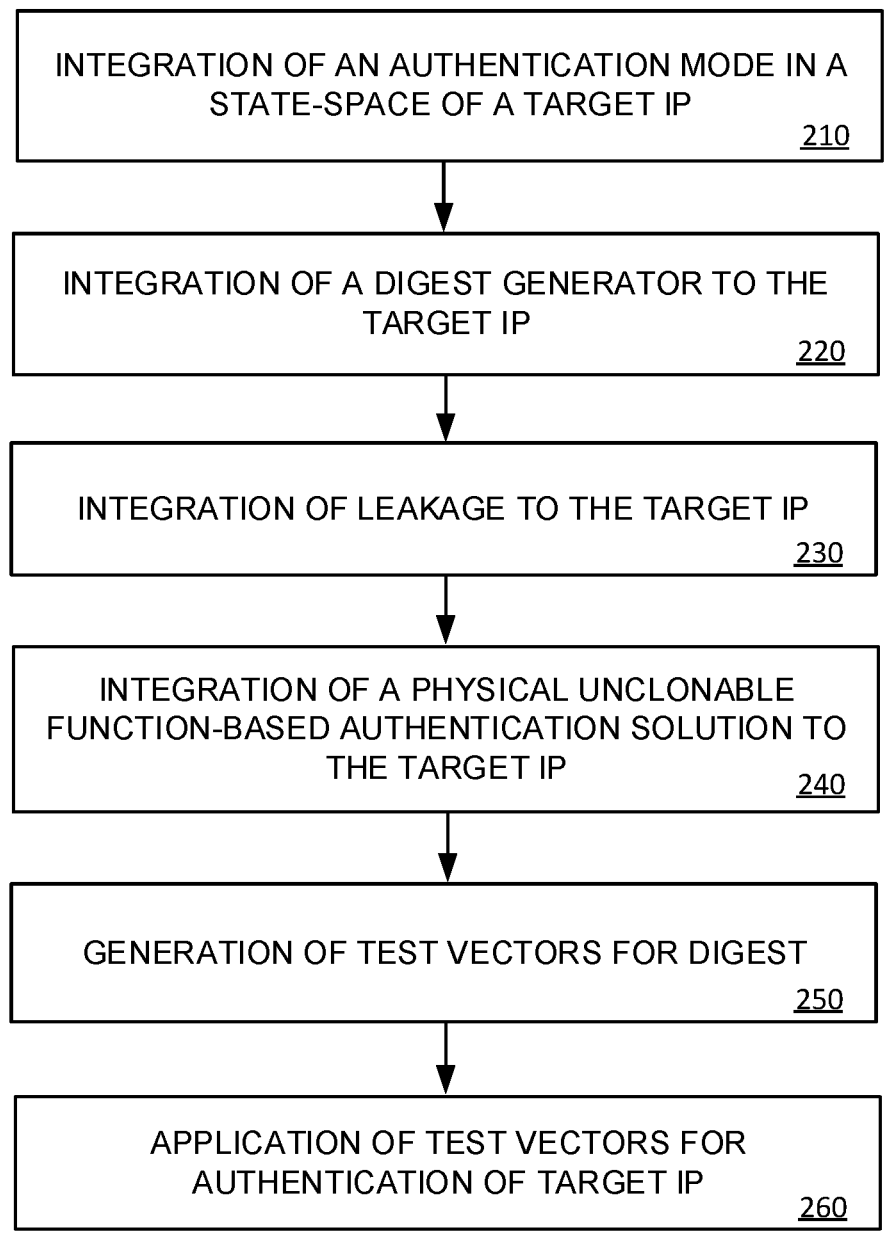
FIG. 2 shows a flow chart of an exemplary method for powerful obfuscation-based intellectual property (IP) watermark labeling in accordance with various embodiments of the present disclosure.

Next, various steps involved in an exemplary method for powerful obfuscation-based intellectual property (IP) watermark labeling is presented. Each step is described in detail below and highlight how they play a role in ensuring that the injected watermark meets the aforementioned watermark guarantees. Accordingly, FIG. 2 shows a flow chart of an exemplary method for powerful obfuscation-based intellectual property (IP) watermark labeling. As such, a target IP design can go through different modifications using secret keys, and the modified IP can then be used for fabricating an integrated circuit (IC) containing the IP. In the field, the IC and its corresponding IP can be authenticated, and their integrity can be verified using exemplary methods/systems of the present disclosure.

For the exemplary method of FIG. 2, a first step involves integration (210) of an authentication mode in a state-space of the IP. In particular, a finite state machine (FSM) of the IP can be augmented based on secret key inputs ($I_1, I_2, I_3$) to integrate additional states that enable authentication and verification of the IC and the IP. Thus, an exemplary technique uses the finite state machine present in the IP as an input and modifies the finite state machine present in the IP by integrating new states for performing authentication and verification. However, the transition between these states is governed by the secret key which is unknown to an attacker but known to the legitimate user. The new injected states are referred to as "watermarking states." It should be noted that this step ensures that the watermark is functionally locked as the access to watermarking states is only possible via the secret key(s).

Figure 3:
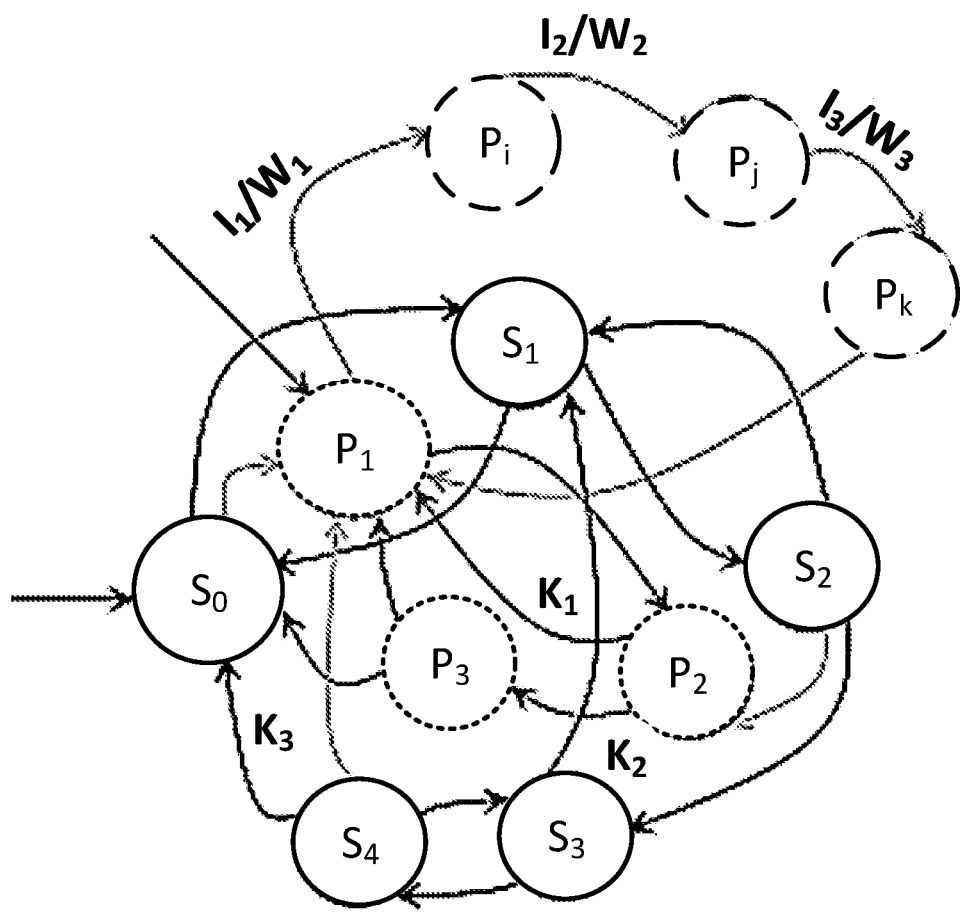
FIG. 3 shows an example of a modified finite state machine (FSM), where $P_i$, $P_j$, and, $P_k$ are the new injected states or the watermarking states and watermark responses W1, W2, W3 can be retrieved by application of challenge inputs $I_1$, $I_2$, and $I_3$ in accordance with various embodiments of the present disclosure.

FIG. 3 shows an example of a modified FSM, where $P_i$, $P_j$, and, $P_k$ are the new injected states or the watermarking states and watermark responses W1, W2, W3 can be retrieved by application of challenge inputs $I_1, I_2,$ and $I_3$ in accordance with various embodiments of the present disclosure. Accordingly, a legitimate user can cause the FSM to transition through these watermarking states by applying the correct secret key, whereas an attacker would only be able to transition between $P_i, P_j, P_3$ without access to the correct secret key. As shown in FIG. 3, the original state space (solid-line states) is obfuscated with the inclusion of new states (dotted-line states) that becomes the new initial state of the design. Enabling the correct functionality requires the traversal of the newly added states ($P_1, P_2, P_3$) with the application of the correct key. Using the same concept, another set of new states $P_x, P_y,$ and $P_z$ (dashed-line states) is also included.

In various embodiments, the watermarking states could be injected to incorporate different functionalities. For example, certain watermarking states could enable digest generation and leakage functionality, while others could enable a physical unclonable function (PUF) logic for authentication functionality. In various embodiments, a software tool is configured to automatically augment the state space to inject the watermarking states.

In accordance with an exemplary framework for watermark labeling, design constraints are set such that design optimization tools cannot not remove the injected watermarking states from the modified IP. This ensures that the immutability criteria of the watermark is satisfied. Thus, the state-space augmentation step 210 ensures that the watermark is injected in such a manner that the immutability and verifiability criteria are satisfied.

Referring back to FIG. 2, a next step of the exemplary method involves integration (220) of a digest generator to the target IP. For digest generation, specific nets are identified within the IP that provides a high probability of reflecting any modification of the IP. Identification of the nets that can be used for injecting the watermarking states can be implemented using various techniques, such as those disclosed by Tamzidul Hoque, Jonathan Cruz, Prabuddha Chakraborty, and Swarup Bhunia, "Hardware IP Trust Validation: Learn (the Untrustworthy), and Verify," 2018 IEEE International Test Conference (ITC), pp. 1-10 (2018). In various embodiments, the detectability of the watermark can be optimized by iteratively refining the nets.

Another criterion that can be used to identify the nets to inject the watermark is structural coverage. From the set of identified nets, nets can be selected that impact a large number of the output bits thereby guaranteeing maximum structural coverage and these nets can be used to generate the digest of the circuit, where the digest is a fixed length pattern that is representative of the entire circuit. In various embodiments, the digest can be generated from the set of identified nets which are fed into a Multiple Input Shift Register (MISR) that combines their logic states to create the digest, which is capable of detecting a wide range of malicious modification in the functionality and structure of the IP.

Figure 4:
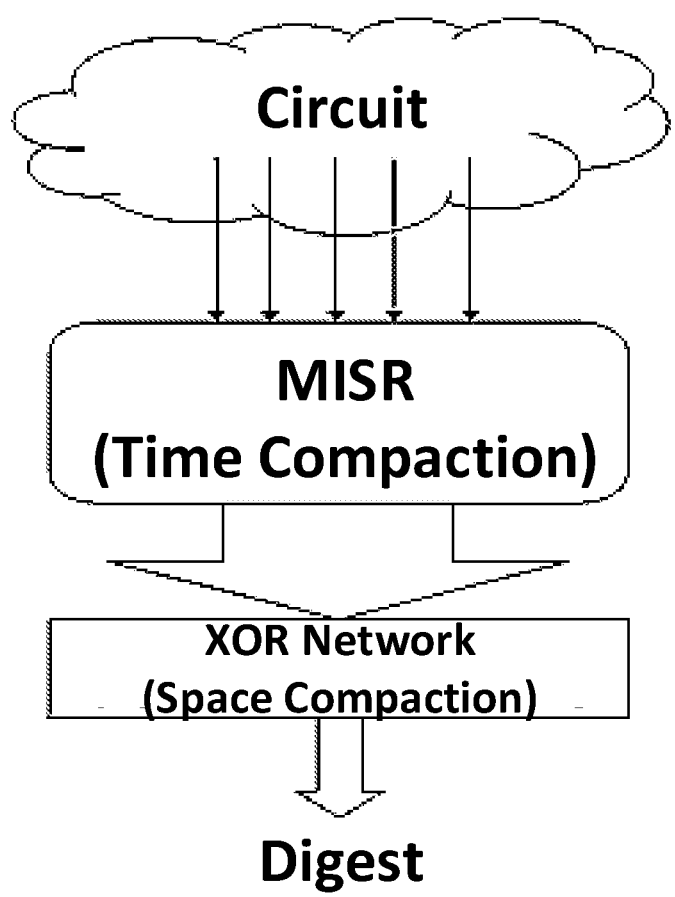
FIG. 4 depicts an exemplary digest creation process, wherein strategically positioned nets within the circuit are probed to create a digest, in accordance with various embodiments of the present disclosure.

FIG. 4 depicts an exemplary digest creation process, wherein strategically positioned nets within the circuit are probed to create a digest. This circuit has two components. The first is an MISR which performs time compaction and uses the values of the probed nets over several timesteps to create an n-bit digest (where n is the number of nets probed in the circuit). This is followed by an XOR tree that performs space compaction and compresses the n-bit digest to the final k-bit digest (k can be selected based on desired collision resistance). Previous works have proposed the use of both MISR and XOR trees to perform compaction. However, none have proposed combining these two methods in this particular manner and achieve both time and space compaction with such small area overhead.

The working of the XOR tree is fairly straightforward and it is capable of compacting an input vector of $2^n$ to a vector of size $2^m$ using $2^n-2^m$ XOR gates. The MISR is an LFSR with extra input paths to every Flip-Flop, and the MISR divides the incoming bit-streams by the characteristic equation of the LFSR and generates the remainder polynomial as the digest. Since the MISR is taking into account the input from multiple timesteps, it is commonly used for time-compaction. Therefore, by combining these two compaction methods, a single digest is able to be generated for a sequence of test inputs (the test vector). This digest is then leaked out using a side-channel (as described in relation to FIG. 6).

Figure 5:
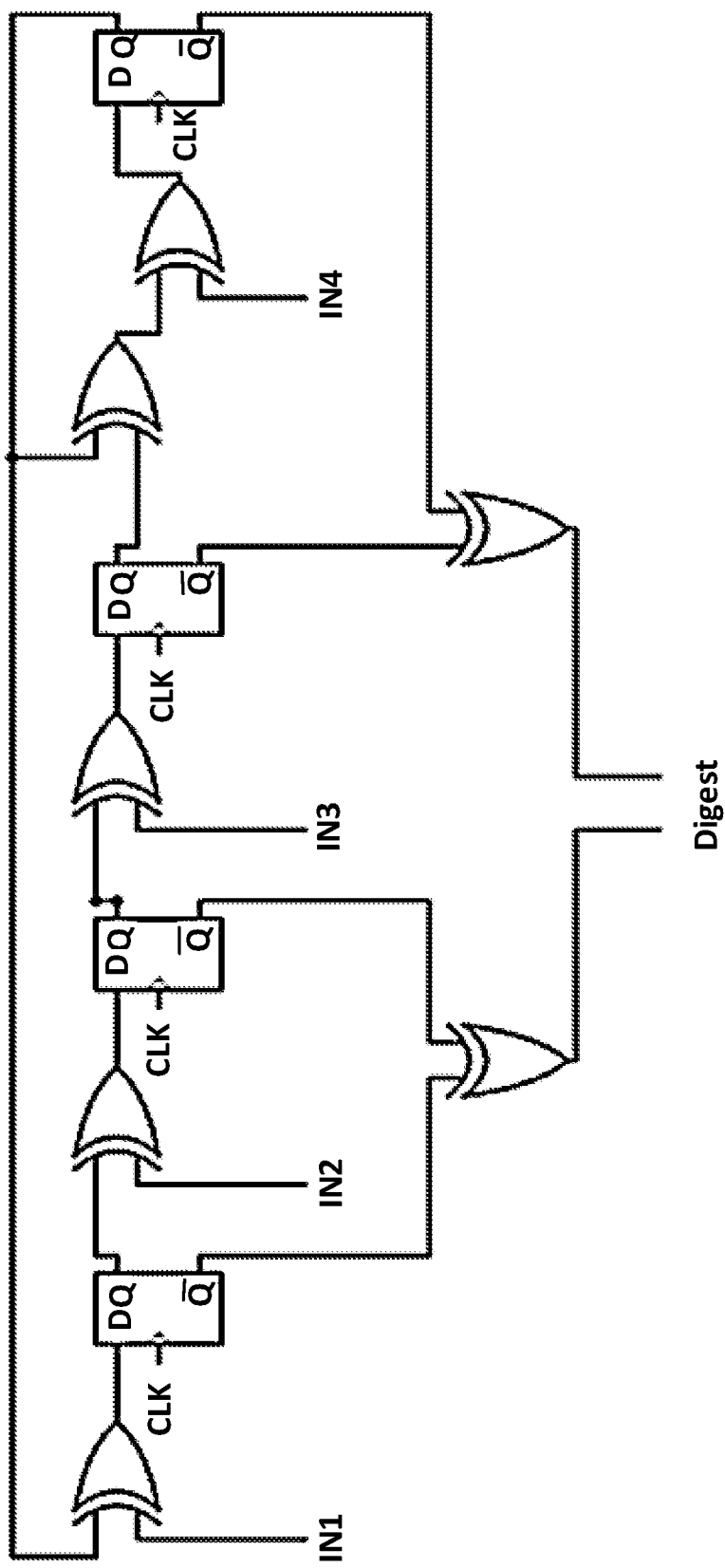
FIG. 5 shows an exemplary digest creation circuit using D-Flip Flops and XOR gates in accordance with various embodiments of the present disclosure.

FIG. 5 shows a sample digest creation circuit using D-Flip Flops and XOR gates. In this example circuit, a 2-bit digest is created by probing 4 nets within the circuit. These 4 nets are connected to the ports labelled as IN1, IN2, IN3, IN4 in the circuit. The particular feedback path present in the circuit is based on the feedback polynomial used and may vary from circuit to circuit. The output of the XOR gates is the created digest.

Experiments have been performed to verify the efficacy of this digest in detecting structural changes in a circuit. This experiment consists of creating structurally modified versions of a circuit and comparing the digests of this circuit with the digests of the unmodified (golden) circuit. The results displayed below in Table I showcase that an exemplary digest performs exceedingly well and that it can reliably detect modifications in the circuit even when less than 5% of the total gates are modified.

TABLE I

| Percentage of Gates Modified | Accuracy of Detection |
| --- | --- |
| 1% | 40% |
| 2.5% | 89% |
| 5% | 98.5% |
| 7.5% | 100% |
| 10% | 100% |

To obfuscate the digest creation logic within the original design to prevent reverse engineering of the digest from the circuit, additional states can be introduced which ensure that the circuit remains non-functional unless the adversary possesses the secret unlocking keys. To leak (230) the correct digest, the FSM should transition through specific states ($P_i$, $P_j$, $P_k$ in FIG. 3), which further protects the secrecy of the digest from static analysis of the design and runtime analysis of the IC in the field. Besides, by observing the unique digests corresponding to multiple different states, the coverage of the verification can be improved.

It can be observed that any change in the IP will cause an alteration of the digest as the logic states of the identified net will be altered. Thus, the digest and the identified nets together help in ensuring that the watermark is undetectable to an adversary while retaining maximum structural coverage. The digest and the identified nets together also ensure that the injected watermark is resistant against tampering attacks. An exemplary technique also prevents the attackers from adding malicious logic into the IP.

If we operate under the zero-trust model where the entire supply chain is untrusted, the exemplary watermark labeling technique should be resilient against modification, tampering, and removal attacks by various adversaries at any stage in the IC supply chain. The foregoing step ensures that the watermark is resilient against these attacks and ensure that the embedded watermark is structurally inaccessible to the attacker thereby meeting the undetectability criteria of the aforementioned watermark guarantees.

As discussed, a next step of the exemplary method involves leakage of a digest to authorized users. Thus, leakage logic should also be integrated (230) within the target IP. Accordingly, while it is important to maintain the secrecy of the digest from unauthorized users, the digest also needs to be broadcasted to authorized parties for the purpose of verification. To facilitate the leakage of the digest in a covert manner, leakage logic provides access to the digest through a side-channel signature of the fabricated IC. Hence, an attacker cannot monitor the observable ports of the electronic system to tap onto the digest. Even if the attacker monitors the side-channel signature when the FSM is transitioning the specific states of digest leakage (i.e. $P_i$, $P_j$, $P_k$), the digests remain private as the digest cannot be deciphered only by observing the side-channel signature. In various embodiments, the attacker would require additional key input(s) to obtain the digest.

To leak the digest to the valid users, a leakage enabling circuit can be integrated within the integrated circuit design. Such a circuit can be built using a logic that causes specific switching activity based on a specific input sequence. Since the switching activity of a circuit impacts its side-channel signature (e.g., power consumption, electromagnetic emanation, etc.), by observing the signature of the integrated circuit under a specific mode of operation, the input to the leakage circuitry can be extracted.

Figure 6:
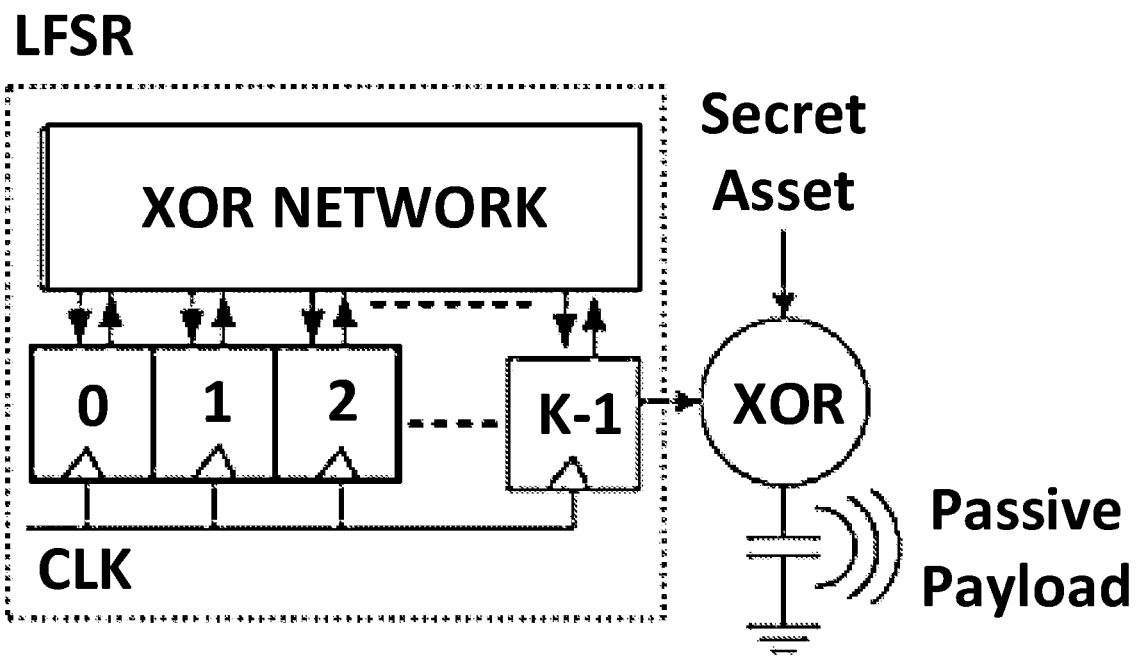
FIG. 6 illustrates an exemplary side-channel leakage enabling circuit in accordance with various embodiments of the present disclosure.

An example of such a side-channel leakage enabling circuit is illustrated in FIG. 6 where a sequence of output data from a Linear-feedback shift register (LFSR) is XORed with the secret asset that is leaked through the side channel. In various embodiments, the output of the XOR gate is connected to a capacitor that charges and discharges based on the XOR output. Hence, the LFSR sequence and the secret asset (digest in our context) controls the charging and discharging of the capacitor, which, in turn, causes an observable impact in the power and electromagnetic signature of the SoC. By analyzing the side-channel signature, one can retain the output sequence generated by the XOR connecting to the capacitor. Hence, the leakage process does not leak the data directly. The extracted data must be further XORed with the output sequence of the LFSR at the specific period of signature extraction, where the sequence of the LFSR depends on its architecture, which is only known to the designer. As shown in FIG. 6, the LFSR primarily contains some flip-flops and a network of XOR gates, in various embodiments. Based on the configuration of the XOR network, a unique LFSR sequence is generated such that only a valid user with the knowledge of the LFSR sequence will be able to decipher the digest leaked using the side-channel leakage circuit.

An additional step of the exemplary method involves integration (240) of a physical unclonable function (PUF)-based authentication solution that can only be used at a specific state of the FSM for authenticating the individual integrated circuit to enable the tracking of individual ICs after deployment, in various embodiments. For example, PUFs can be used to generate unique signatures for all ICs fabricated from the same IP by exploiting the inherent random variations in the manufacturing process. The randomness introduced due to process variations guarantees every PUF will have the following two properties: no two PUFs will produce the same response when the same challenge is fed as an input; and no two challenges will generate the same response when given as input to the same PUF. Accordingly, these properties can be used to authenticate the ICs when they are deployed on the field.

An exemplary IC authentication process comprises an enrollment operation/phase and an authentication operation/phase. The enrollment operation involves the storage of challenge-response pairs in a database prior to deployment with respect to the PUF of an IC. Therefore, the authentication operation involves, when the IC is deployed in the field, the IC is given the challenge as an input and the corresponding response is compared with the database. To make the authentication robust, a large number of challenge-response pairs can be collected in the enrollment phase and the authentication can be performed against multiple challenges.

In various embodiments, the PUF logic can be integrated into the integrated circuit, such that the PUF logic can only be accessed via specific states in the IC's state space (e.g., $P_i$, $P_j$, $P_k$ in FIG. 3), which restricts the access to the PUF or the authentication feature only to valid users as they have the necessary information (secret key) to traverse the finite state machine to reach the specific state in order to access the PUF.

Figure 7A:
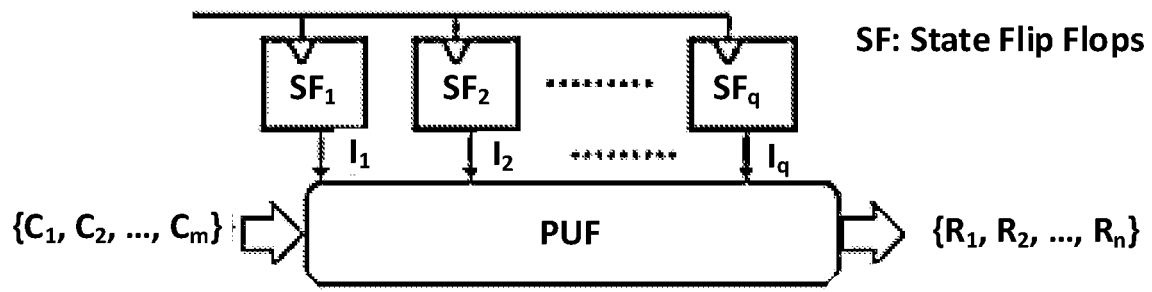
FIG. 7A illustrates an exemplary mechanism to achieve authentication using a physical unclonable function circuit in accordance with various embodiments of the present disclosure.
Figure 7B:
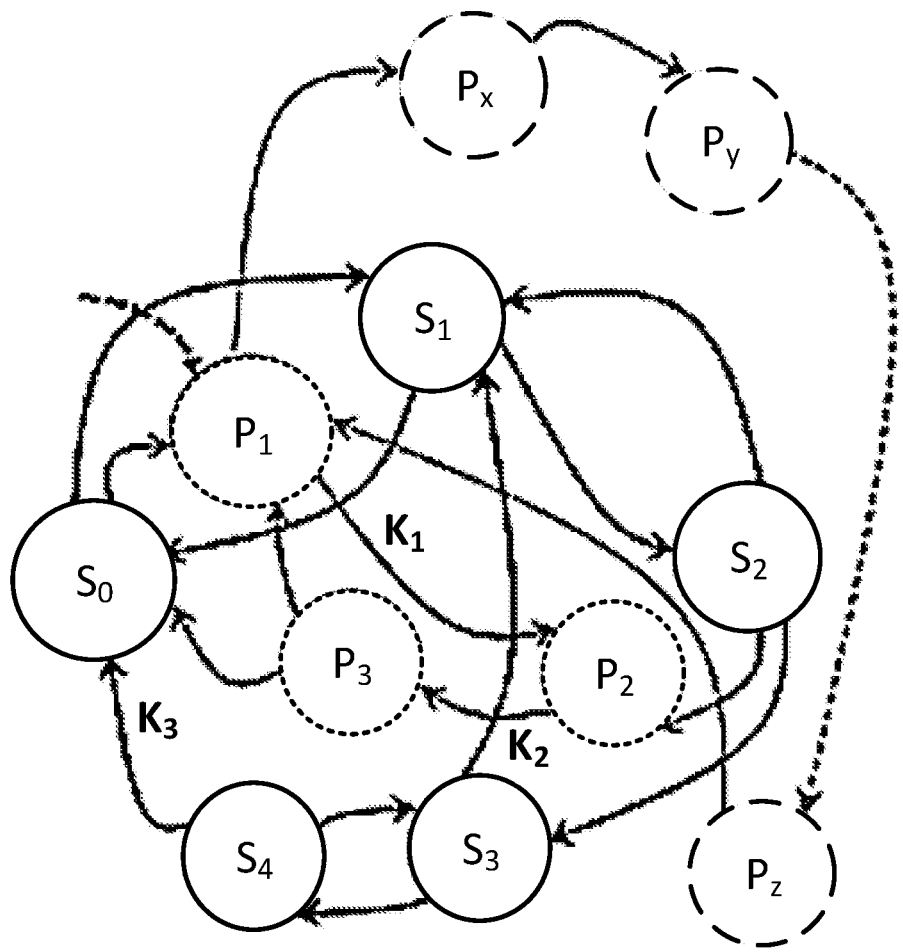
FIG. 7B shows an example of a modified state space (FSM), where $P_x$, $P_y$, and, $P_z$ are the new injected states in accordance with various embodiments of the present disclosure.

FIG. 7A shows a possible mechanism to achieve such restricted authentication feature using a PUF, such as, but not limited to, a delay-based PUF. While the design of the delay based PUF is not novel, protecting the PUF-based authentication from attackers by enabling restricted access to the PUF using state-space obfuscation is novel. As shown in FIG. 7B, the original state space (solid line states) is obfuscated with the inclusion of new states (dotted line states) that becomes the new initial state of the design. Enabling the correct functionality requires the traversal of the newly added states ($P_1$, $P_2$, $P_3$) with the application of the correct key. Using the same concept, another set of new states $P_x$, $P_y$, and $P_z$ (dashed line states) is also included. Only when the design reaches the state $P_z$, the state flip flops (SFs) generate a certain state encoding ($I_1, I_2, \ldots, I_q$) which is used as the enabling input to the PUF. Unless the correct state $P_z$ is reached, the paths within the PUF do not generate the same challenge-response pairs as the authentic pairs stored in the database. Therefore, an output of the PUF from an authentic IC cannot be collected without knowing the correct input key sequence to reach $P_z$ and the corresponding challenges that are applied in that state.

An additional step of the exemplary method involves the generation (250) of test vectors to ensure that structural or functional changes of the IP can be reflected in the leaked digest. In general, the purpose of generating vectors is to apply them in the field to check for possible malicious alteration through the observation of digests in watermarking states. However, exhaustive testing of large circuits is infeasible due to the power and timing limitations. Hence, it is necessary to generate a set of input vectors, also referred to as test vectors, which cover a large portion of the IP's state space. If the test vectors do not have high coverage, the attacker can use these rarely triggered states to perform certain alterations to the circuit which could remain undetected as they may not impact the digest. While traditional approaches to test vector generation employ either manual efforts or randomized test pattern generation, an exemplary embodiment of the present disclosure can utilize reinforcement learning techniques to automatically generate an optimal test vector set for an individual IP that meets the required coverage criteria.

The next step of the exemplary method involves in field authentication and integrity verification (260). Accordingly, upon fabrication, a design house can verify the integrity of the manufactured IC by producing the digest with the application of correct state transition inputs, in which the application of the correct input transitions the IC through the watermarking states. The test vectors can then be applied to produce the digest of the IC which is then compared with the golden digest known to the design house. If the digests match, the integrity of the IC is verified, and the enrollment process is executed before the IC is shipped to the market. The challenge-response pairs collected during the enrollment process are stored in a database as mentioned in step 240 to enable authentication of the ICs when deployed.

In the field (after deployment), when the IC needs to be authenticated, it can be first traversed to the watermarking states with the application of specific key inputs to the IP, in which the PUF becomes functional only at those states. The response of the correctly functioning PUF can then be observed under the application of various challenge inputs. If the responses match the golden references stored during the enrollment process, the IC is recognized as an authentic device.

Certain embodiments of the present disclosure can be implemented in hardware, software, firmware, or a combination thereof. Accordingly, certain embodiments are implemented in software or firmware that is stored a computer-readable medium, such as in a memory, and that is executed by a suitable instruction execution system (e.g., one or more computing processors). If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present disclosure includes embodying the functionality of embodiments of the present disclosure in logic embodied in hardware or software-configured mediums.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure.

The invention claimed is:
1. A method comprising:
 identifying, by one or more computing processors, a specific net within an integrated circuit design that is likely to be used in a malicious attack;

adding, by the one or more computing processors, additional nets to the integrated circuit design that add additional logic states to a finite state machine present in the integrated circuit design, wherein the additional logic states comprise watermarking states for performing authentication of the integrated circuit design, wherein a state transition to the watermarking states is dependent upon on an output of the specific net, wherein an output of the additional nets is governed by one or more secret key inputs applied to the additional nets, wherein the additional nets comprise a multiple shift input register (MISR) followed by an XOR network;

applying, by the one or more computing processors, the secret key inputs to the additional nets;

capturing, by the one or more computing processors at an output of a leakage enabling circuit, a side channel signature upon application of the secret key inputs to the additional nets; and deciphering, by the one or more computing processors, a watermark digest from the side channel signature based on a switching activity of the output of the leakage enabling circuit, wherein the MISR applies values of individual nets over multiple timesteps to create an n-bit digest and the XOR network compresses the n-bit digest to a final k-bit watermark digest, where k<n, wherein when the integrated circuit design is being authenticated, a manufactured integrated circuit design is traversed to the watermarking states with an application of specific key inputs, wherein the additional nets becomes functional in generating a correct watermark digest response only at the watermarking states, wherein if responses match golden references stored during an enrollment process of the integrated circuit design, the manufactured integrated circuit design is recognized as an authentic device, wherein the responses correspond to the watermark digest and the specific key inputs correspond to the secret key inputs.

2. The method of claim 1, wherein the watermark digest is a fixed length pattern that is representative of the integrated circuit design.

3. The method of claim 1, wherein challenge-response pairs for the manufactured integrated circuit design are stored in a database prior to deployment of the integrated circuit design, wherein the watermark digest for the secret keys input is compared with a challenge-response pair from the database.

4. The method of claim 1, wherein the specific key inputs are applied in a sequential order.

5. The method of claim 1, further comprising coupling a physical unclonable function (PUF) circuit to the output of the additional nets, wherein traversal of the logic states of the additional nets is required to access an input logic state of the PUF circuit, wherein a unique authentication signature for an individual integrated circuit is captured via an output of the PUF circuit.

6. The method of claim 1, wherein the leakage enabling circuit comprises a capacitor, wherein an output of the XOR network is coupled to the capacitor, wherein the side channel signature of the capacitor is captured to form the watermark digest.

7. The method of claim 1, wherein the secret key inputs comprise a series of test vectors, the method further comprising generating the test vectors using reinforcement learning.

8. The method of claim 5, wherein the PUF circuit is enabled to output the unique authentication signature upon application of a correct input key sequence for the PUF circuit.

9. The method of claim 6, wherein the MISR is a linear-feedback shift register and the XOR network is an XOR gate.

10. A system comprising:
a processor and memory, wherein the memory stores instructions that, in response to execution by the processor, cause the processor to perform operations comprising:
identifying a specific net within an integrated circuit design that is likely to be used in a malicious attack;
adding additional nets to the integrated circuit design that add additional logic states to a finite state machine present in the integrated circuit design, wherein the additional logic states comprise watermarking states for performing authentication of the integrated circuit design, wherein a state transition to the watermarking states is dependent upon on an output of the specific net, wherein an output of the additional nets is governed by one or more secret key inputs applied to the additional nets, wherein the additional nets comprise a multiple shift input register (MISR) followed by an XOR network;
applying the secret key inputs to the additional nets;
capturing, at an output of a leakage enabling circuit, a side channel signature upon application of the secret key inputs to the additional nets; and
deciphering a watermark digest from the side channel signature based on a switching activity of the output of the leakage enabling circuit, wherein the MISR applies values of individual nets over multiple timesteps to create an n-bit digest and the XOR network compresses the n-bit digest to a final k-bit watermark digest, where k<n,
wherein when the integrated circuit design is being authenticated, a manufactured integrated circuit design is traversed to the watermarking states with an application of specific key inputs, wherein the additional nets becomes functional in generating a correct watermark digest response only at the watermarking states, wherein if responses match golden references stored during an enrollment process of the integrated circuit design, the manufactured integrated circuit design is recognized as an authentic device, wherein the responses correspond to the watermark digest and the specific key inputs correspond to the secret key inputs.

11. The system of claim 10, wherein the watermark digest is a fixed length pattern that is representative of the integrated circuit design.

12. The system of claim 10, wherein the secret key inputs are applied in a sequential order.

13. The system of claim 10, further comprising a physical unclonable function (PUF) circuit coupled to the output of the additional nets, wherein traversal of the logic states of the additional nets is required to access an input logic state of the PUF circuit, wherein an output of the PUF circuit is configured to signal a unique authentication signature for an individual integrated circuit.

14. The system of claim 10, wherein the leakage enabling circuit is characterized by specific switching activity based on a specific input sequence, wherein the leakage enabling circuit comprises a capacitor, wherein an output of the XOR network is coupled to the capacitor, wherein the side channel signature of the capacitor is captured to form the watermark digest.

15. The system of claim 10, wherein the secret key inputs comprise a series of test vectors.

16. The system of claim 13, wherein the PUF circuit is enabled to output the unique authentication signature upon application of a correct input key sequence for the PUF circuit.

17. The system of claim 14, wherein the MISR is a linear-feedback shift register and the XOR network is an XOR gate.

* * * * *